S. MUNSON.
SHOCK ABSORBING MECHANISM.
APPLICATION FILED MAY 13, 1920.

1,370,835.

Patented Mar. 8, 1921.
2 SHEETS—SHEET 1.

Inventor,
SWENEY MUNSON
By Warren D. House
His Attorney.

Witness:
R. E. Hamilton

S. MUNSON.
SHOCK ABSORBING MECHANISM.
APPLICATION FILED MAY 13, 1920.

1,370,835.

Patented Mar. 8, 1921.
2 SHEETS—SHEET 2.

Inventor,
SWENEY MUNSON
By Warren W. House
His Attorney.

Witness:
R. E. Hamilton

UNITED STATES PATENT OFFICE.

SWENEY MUNSON, OF FOWLER, COLORADO.

SHOCK-ABSORBING MECHANISM.

1,370,835.

Specification of Letters Patent.   Patented Mar. 8, 1921.

Application filed May 13, 1920. Serial No. 381,156.

*To all whom it may concern:*

Be it known that I, SWENEY MUNSON, a citizen of the United States, residing at Fowler, in the county of Otero and State of Colorado, have invented a certain new and useful Improvement in Shock-Absorbing Mechanisms, of which the following is a specification.

My invention relates to improvements in shock absorbing mechanisms.

The object of my invention is to provide a simple shock absorbing mechanism, particularly adapted for use on automobiles, which is cheap to make, which is strong and durable, which adds to the strength of the vehicle, which is efficient in operation, and which is adapted for application to cars now in use.

The novel features of my invention are hereinafter fully described and claimed.

In the accompanying drawings, which illustrate my invention, as applied to a type of car now in general use, Figure 1 is a front elevation, showing my invention applied to the front axle of the car.

Similar reference characters designate similar parts in the different views.

Figure 1:
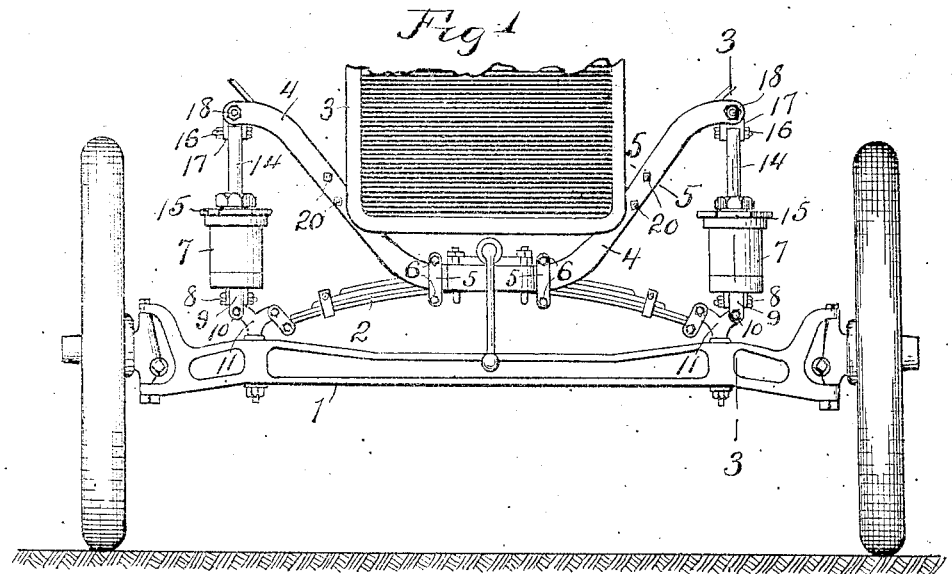
Figure 2:
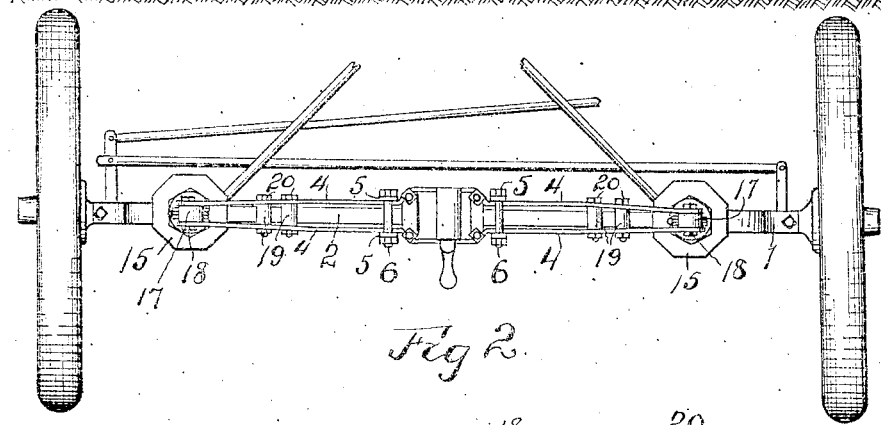
Fig. 2 is a top view of the same.
Figure 4:
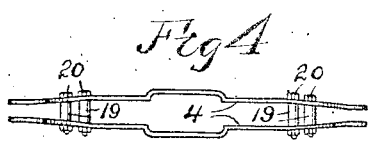
Fig. 4 is a top view of the two transverse bars shown in Fig. 1.

1 designates the front axle of the automobile which supports in the usual manner an ordinary leaf bow spring 2.

The frame which supports the body 3 includes two substantially U-shaped bars 4, disposed respectively at the front and rear sides of the spring 2 to which the transverse bars 4 are clamped by vertical plates 5 which are connected by bolts 6.

Two shock absorbing devices are supported by the front axle 1 and are respectively pivoted to opposite ends of the bars 4.

Figure 3:
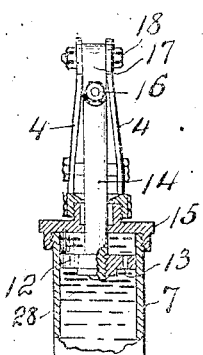
Fig. 3 is a vertical sectional view, enlarged, on the line 3—3 of Fig. 1.

Each of said shock absorbing devices may consist of a dash pot cylinder 7, Fig. 3, which is pivoted by a transverse bolt 8 to an inverted U-shaped member 9, which is pivoted by a longitudinal bolt 10 to a member 11 which supports the spring 2 and is supported by the axle 1.

Reciprocative in the cylinder 7 is a piston 12 having one or more by-pass openings 13, and having a piston rod 14 slidably mounted in the head 15 of the cylinder and having its upper end pivoted by a transverse bolt 16 to a member 17 which is pivoted by a longitudinal bolt 18 to and between the adjacent ends of the bars 4.

Figure 5:
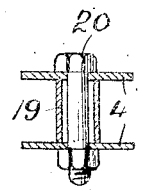
Fig. 5 is an enlarged cross section on the line 5—5 of Fig. 1.

The bars 4 at opposite sides of the body 3 are spaced apart by tubes 19, Fig. 5, to the ends of which the bars 4 are respectively clamped by bolts 20.

Figure 6:
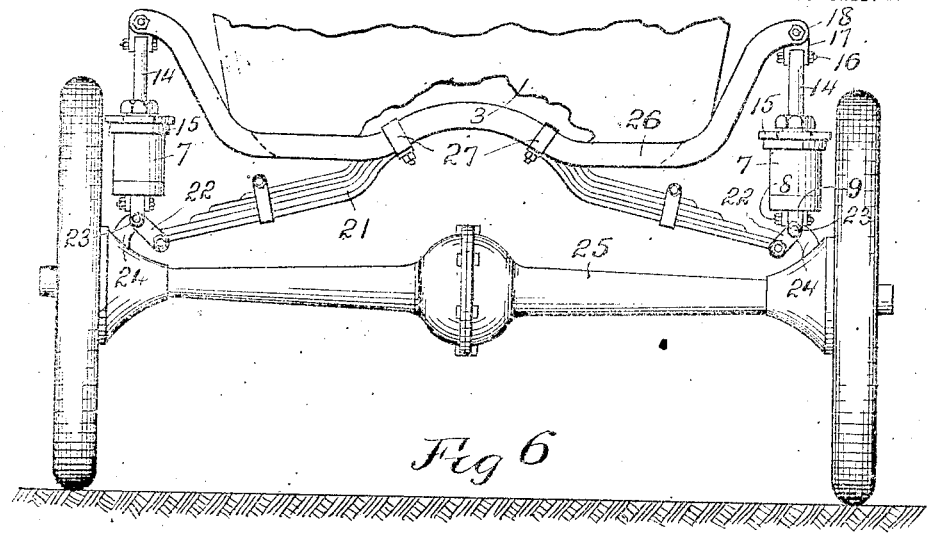
Fig. 6 is a rear elevation showing my invention applied to the rear axle casing.
Figure 7:
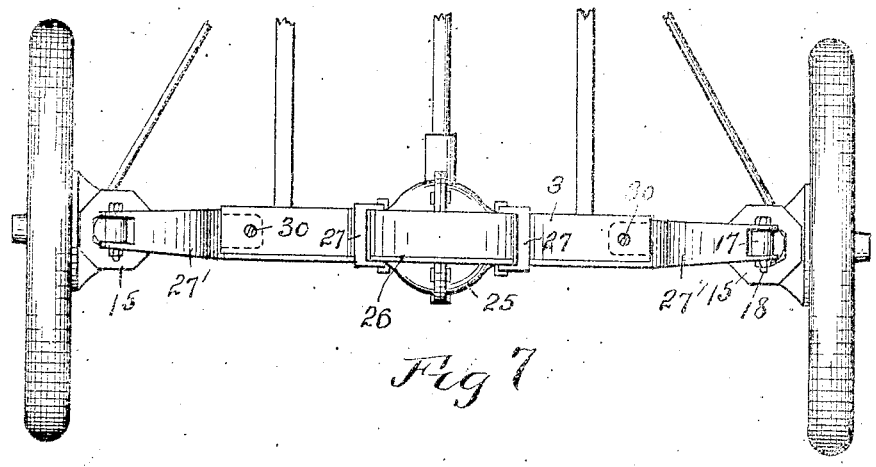
Fig. 7 is a top view of what is shown in Fig. 6.

21 designates the rear spring of the vehicle, which spring is a transverse spring of the usual leaf bow type having its ends pivotally supported in the usual manner by links 22 supported on longitudinal bolts 23 mounted in projections 24, Figs. 6 and 7, on the upper side of the rear axle casing 25.

A substantially U-shaped transverse bar 26, disposed edge up, is rigidly secured by clips 27 to the center of the spring 21.

Two shock absorbing devices, preferably similar to the ones already described, are supported by the bolts 23 respectively which correspond to the bolts 10.

The transverse plate 26 adjacent to each end is provided with an upwardly and outwardly extending channel portion 27' between the two arms of which is mounted a member 17 pivoted on a bolt 18 extending through said arms. The member 17 is pivoted by the transverse bolt 16 to the piston rod 14 which is reciprocative in a dash pot cylinder 7 supported in the manner already described, by a bolt 8 pivoted to a member 9 which pivotally mounted on the adjacent bolt 23.

In the operation of my invention, the downward movement of the body 3 with the spring 21, is resisted by the pistons 12, which operate in the usual manner, in liquid 28 contained in each of the cylinders 7.

Figure 8:
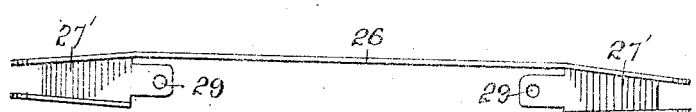
Fig. 8 is a bottom view of the transverse bar which is applied to the rear spring.

The inner end of each channel portion 27' of the plate 26 may be provided with a vertical hole 29, Fig. 8, adapted to receive a bolt 30, Fig. 7, for attaching the plate 26 to the body 3.

In the application of the plates 4 to a car already in use, said plates 4 may be clamped by the plates 5 to opposite sides of the front spring 2, and a supporting member 11 of the type illustrated may be substituted for the corresponding spring supporting member with which the car is provided at the factory.

In applying the plate 26 to the rear spring 21, on a car already in use, it is but necessary to utilize the clip 27 with which the car is already provided, and to substitute a longer bolt 23 for the bolt which is ordinarily employed to support the link 22.

I do not limit my invention to the structure shown and described, as many modifications, within the scope of the appended claims, may be made without departing from the spirit of my invention.

What I claim is:—

1. In shock absorbing mechanism of a vehicle, the combination with an axle, a spring supported thereby, and a frame supported by the spring and including a transverse bar, of two shock absorbing devices supported by the axle and respectively supporting the ends of said bar, substantially as set forth.

2. In shock absorbing mechanism of a vehicle, the combination with an axle, a spring supported thereby and a frame supported by the spring and including two transverse bars disposed respectively at opposite sides of the spring, of two shock absorbing devices supported by the axle and respectively supporting the opposite ends of said bars, substantially as set forth.

3. In shock absorbing mechanism of a vehicle, the combination with an axle, a spring supported thereby, and a frame supported by the spring and including a substantially U shaped bar, of two shock absorbing devices supported by the axle and respectively pivoted to the ends of said bar, substantially as set forth.

4. In shock absorbing mechanism of a vehicle, the combination with an axle, a spring supported thereby, and a frame supported by the spring and including two transverse bars disposed respectively at opposite sides of the spring and clamped thereto, of two shock absorbing devices supported by the axle and respectively supporting and pivoted to opposite ends of said bars, substantially as set forth.

5. In shock absorbing mechanism of a vehicle, the combination with an axle, a spring supported thereby, and a frame supported by the spring and including a transverse bar clamped to the spring, of two shock absorbing devices supported by the axle and respectively supporting opposite ends of said bar, substantially as set forth.

In testimony whereof I have signed my name to this specification.

SWENEY MUNSON.